Aug. 5, 1969         M. L. EDWARDS         3,459,310
MEMBRANE FLUID DIFFUSION EXCHANGE DEVICE
Filed April 18, 1967                    4 Sheets-Sheet 4
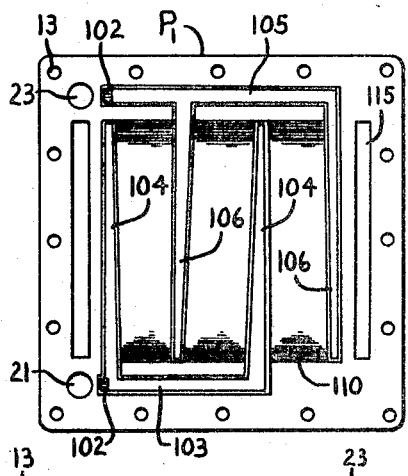
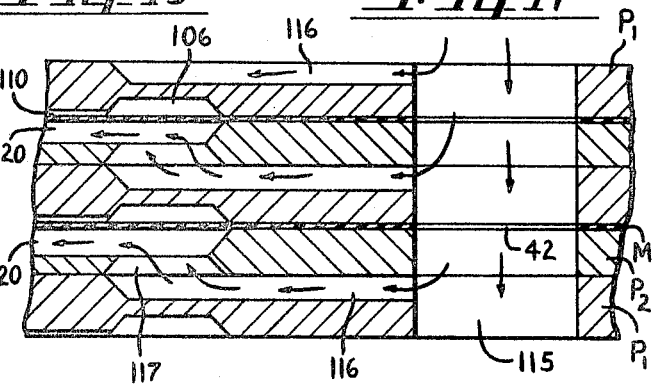
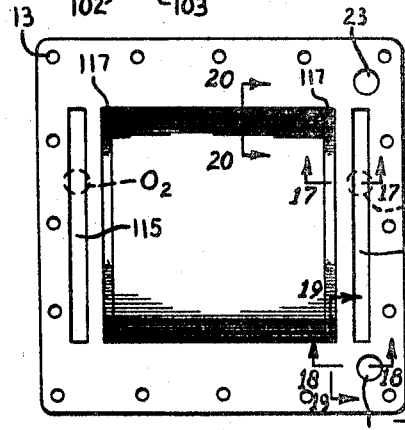
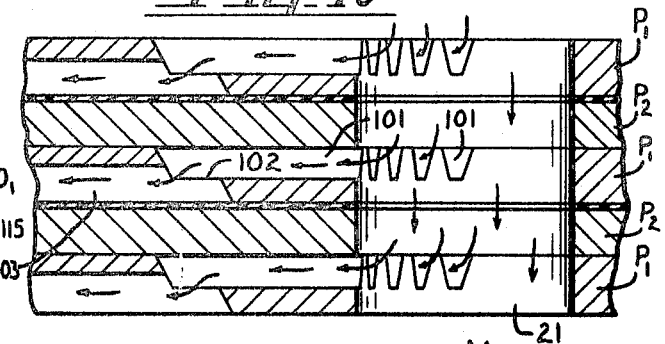
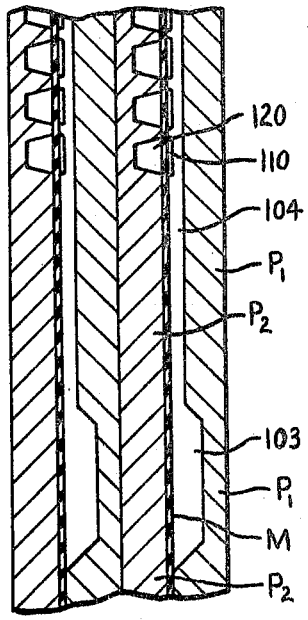
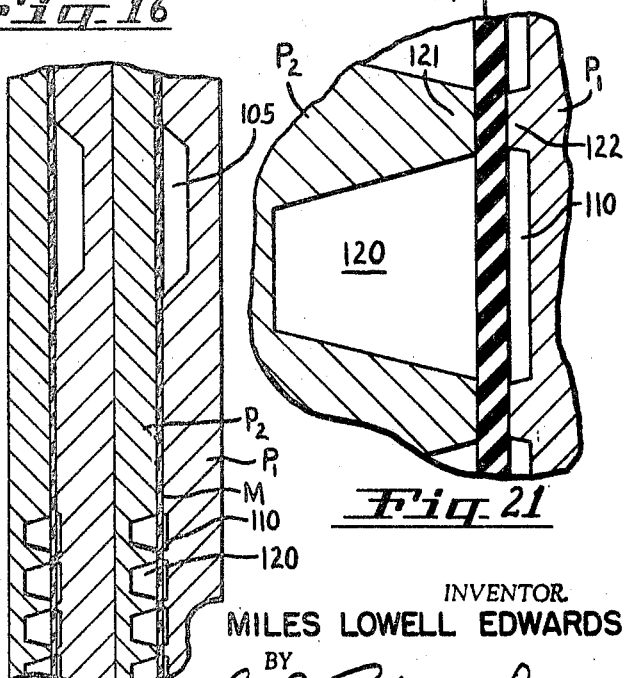
INVENTOR.
MILES LOWELL EDWARDS
BY
Attorney

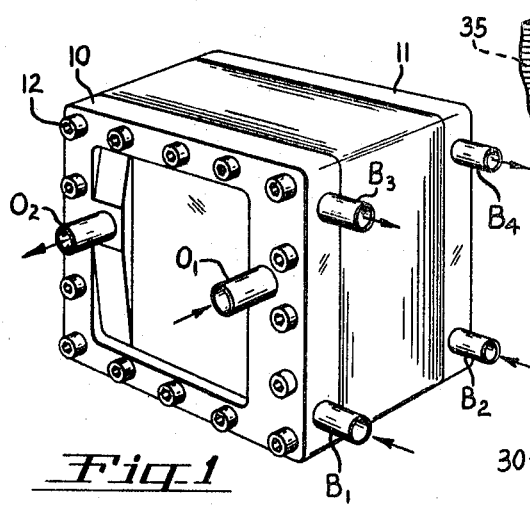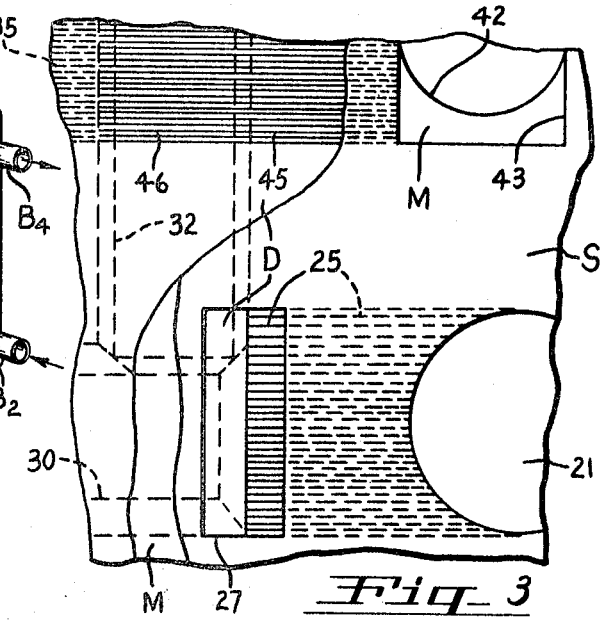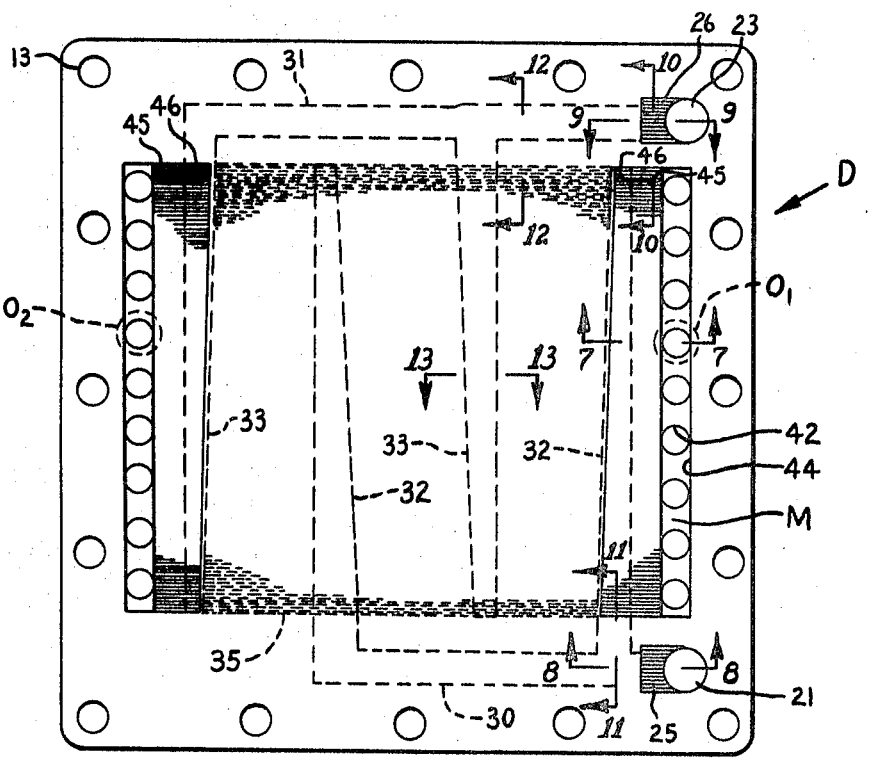

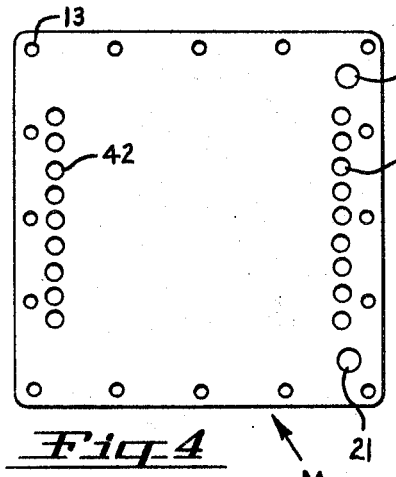
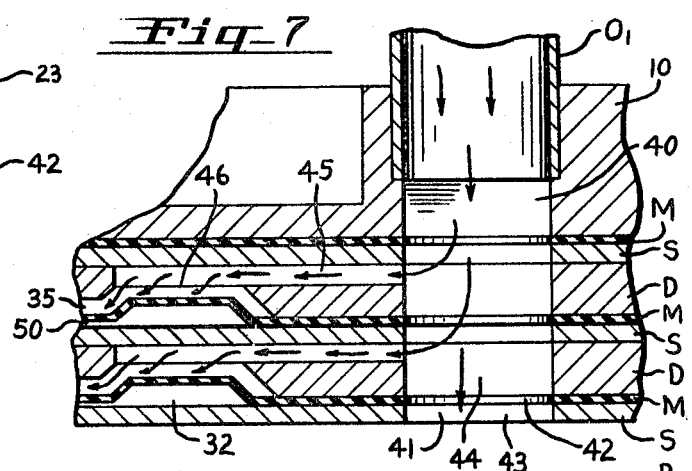
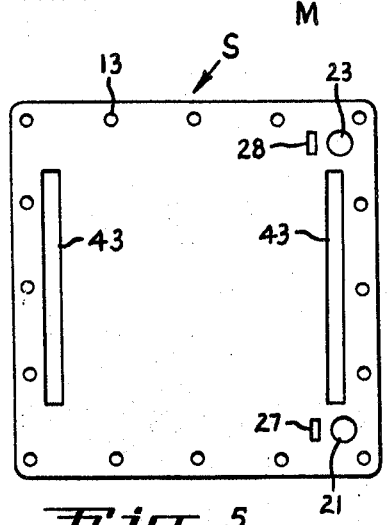
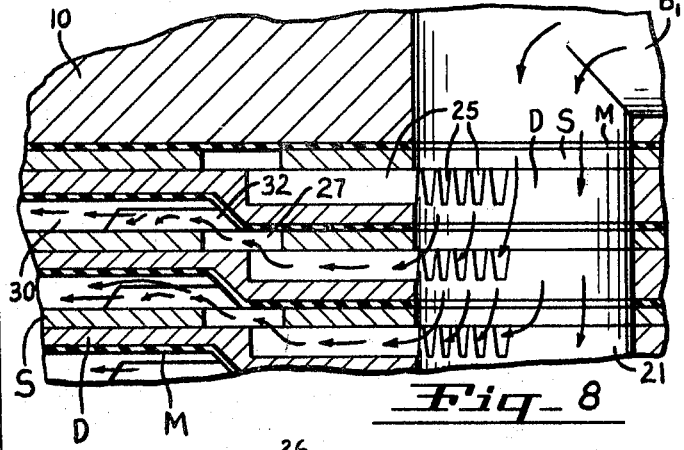
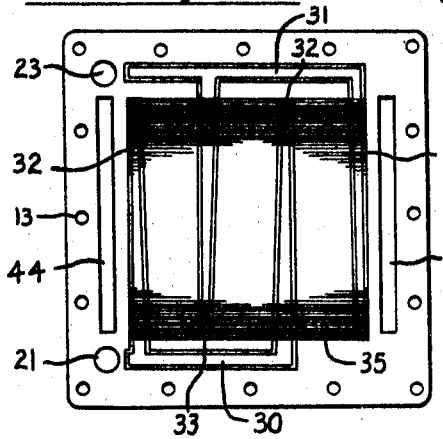
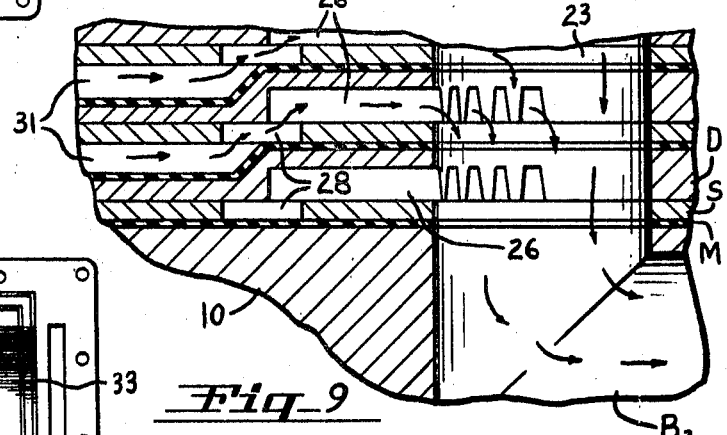

United States Patent Office 3,459,310
Patented Aug. 5, 1969

3,459,310
MEMBRANE FLUID DIFFUSION EXCHANGE DEVICE
Miles Lowell Edwards, 13191 Sandhurst Place, Santa Ana, Calif. 92705
Continuation-in-part of application Ser. No. 456,675, May 18, 1965. This application Apr. 18, 1967, Ser. No. 631,668
Int. Cl. B01d 13/00
U.S. Cl. 210—321                                         10 Claims

ABSTRACT OF THE DISCLOSURE

A device for the treatment of blood, for use either as an oxygenator or a kidney dialysis device, comprising a clamped stack of plates and membrane sheets wherein capillary passageways are formed by grooves in the plates.

Cross-references to related applications

This application is a continuation-in-part of Ser. No. 456,675 filed May 18, 1965, for Membrane Diffusion Device.

Background of the invention

Previous membrane diffusion devices for blood oxygenation and dialysis purposes have been difficult and costly to manufacture. They have also been objectionably bulky, requiring an excessive amount of priming blood to fill the blood passageways and chambers. Such bulk results from the problem of providing a sufficiently large area of the membrane material in contact with the blood for effective diffusion exchange.

It will be recognized that such a device is practically impossible to clean and re-sterilize whereby the device must be made for a single use. It is desired to provide an improved form of construction which is less complicated and expensive to manufacture and which requires less priming blood than existing devices for the purpose.

Summary of the invention

This invention relates to a membrane fluid diffusion exchange device, particularly for the oxygenation or dialysis of blood. The device is intended for temporary bedside use and, when used as an oxygenator, would be employed temporarily for a limited period of time to improve the condition of the patient's blood. For example, blood may be taken from a vein in the patient's leg, passed through a suitable pump, oxygenated in the present device and returned to an artery in the patient's arm. In such use the present device does not take the place of the patient's own lungs as in a surgical heart-lung machine but merely supplements the oxygenating effort of the patient's lungs. However, the present device may also be used as an oxygenator in a heart-lung machine to take the place of the patient's own lungs temporarily during surgery if desired.

The present device comprises a stack of plates and membranes which are clamped together between end plates so that there can be no leakage between the clamped surfaces. Each membrane is clamped between two plates, one being a relatively hard separator plate and the other being a relatively softer plate to act as a gasket. The plates are perforated to provide fluid passageways through the stack and are grooved to provide communication with a special form of capillary system. Such support of the membranes permits the use of very thin and fragile membrane material and the special form of the capillary system permits the use of membrane material which is not heat sealable.

The capillary system is formed by a pattern of minute grooves which are closed on one side by a membrane sheet. This is an improvement over the device in Ser. No. 456,675 wherein the capillary system comprises passageways formed in a membrane envelope. The geometric pattern of the capillary system and feeder ducts is generally similar to that in Ser. No. 456,675.

The objects of the invention are, therefore, to provide an improved membrane fluid diffusion exchange device, to provide a device of the type described which is less complicated and expensive to manufacture, and which requires less priming fluid, than existing devices, to provide a device of the type described comprising a stack of membrane sheets and plates in which each membrane sheet is clamped between two supporting plates, to provide a device of the type described having capillary passageways formed by grooves in supporting plates which are sandwiched together with membrane sheets and to provide an improved capillary system in the general geometric pattern and arrangement shown in Ser. No. 456,675.

The foregoing and other objects and advantages will become apparent and the invention will be better understood with reference to the following description of certain preferred embodiments illustrated in the accompanying drawings. Various changes may be made in the details of construction and arrangement of parts and certain features may be used without others. All such modifications within the scope of the appended claims are included in the invention.

Brief description of the drawings

FIGURE 1 is a perspective view of a device embodying the principles of the invention;

FIGURE 2 is a front elevation view of a diffusion plate and membrane sheet in the device of FIGURE 1;

FIGURE 3 is an enlarged fragmentary front elevation view of the lower right corner of the assembled plates and membrane sheet, with parts broken away;

FIGURE 4 is a front elevation view of a membrane sheet;

FIGURE 5 is a front elevation view of a separator plate;

FIGURE 6 is a rear elevation view of the diffusion plate in FIGURE 2;

FIGURE 7 is an enlarged view of the complete assemblage, taken on the line 7—7 in FIGURE 2;

FIGURE 8 is an enlarged view of the complete assemblage, taken on the line 8—8 in FIGURE 2;

FIGURE 9 is an enlarged view of the complete assemblage, taken on the line 9—9 in FIGURE 2;

FIGURE 15 is a rear elevation view of a diffusion plate in a modified form of construction;

FIGURE 16 is a front elevation view of a separator plate in the modification;

FIGURE 17 is an enlarged view of the assembled plates and membrane sheets, taken on the line 17—17 in FIGURE 16;

FIGURE 18 is an enlarged view of the assembled plates and membrane sheets, taken on the line 18—18 in FIGURE 16;

FIGURE 19 is an enlarged view of the assembled plates and membrane sheets, taken on the line 19—19 in FIGURE 16;

FIGURE 20 is an enlarged view of the assembled plates and membrane sheets, taken on the line 20—20 in FIGURE 16; and FIGURE 21 is a greatly enlarged fragmentary sectional view showing one of the capillary passageways in the modification.

Description of the preferred embodiments

Figure 10:
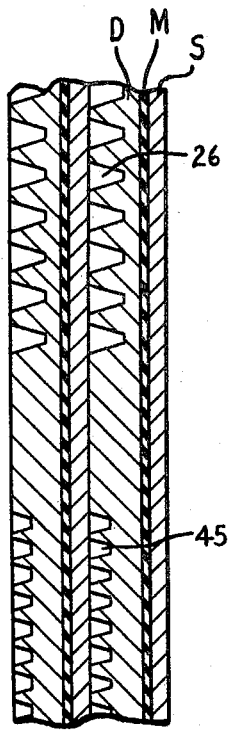
FIGURE 10 is an enlarged view of the assembled plates and membrane sheets, taken on the line 10—10 in FIGURE 2.

As shown in FIGURE 1, the device comprises a stack of plates and membranes tightly clamped between a pair of rigid front and back plates 10 and 11 for use as a blood oxygenator. Clamping pressure is maintained by a plurality of marginal bolts 12 which pass through holes 13 in the plates and membranes as shown in other views. Front plate 10 is equipped with an oxygen inlet connection $O_1$ and an oxygen outlet connection $O_2$ on the face of the plate. Edges of the plates 10 and 11 on one side of the stack are equipped with a pair of blood inlet connections $B_1$ and $B_2$ adjacent the bottom of the stack and a pair of blood outlet connections $B_3$ and $B_4$ adjacent the top of the stack.

One of the membrane sheets M is shown in FIGURE 4 provided with blood and oxygen openings as will presently be described for conveying the blood and oxygen in separate passageways from one end of the stack to the other. The membrane sheets are preferably made of extremely thin, elastic, silicone rubber on the order of .0025 inch thick. This material has a minute porosity which is utilized for diffusion exchange between fluids on opposite sides of the membrane.

Each membrane sheet M is clamped between a separator plate S and a diffusion plate D. FIGURE 5 shows the front side of a separator plate and FIGURE 2 shows the front side of a diffusion plate. FIGURE 6 shows the back side of the diffusion plate. Separator plates S are molded of a relatively hard plastic approximately 0.15 inch thick. These are plain flat plates having blood and oxygen openings therein as will presently be described.

Diffusion plates D are molded of a somewhat softer plastic to function as gaskets between the hard plates and are approximately .040 inch thick. These plates also contain blood and oxygen openings and are grooved in different patterns on their opposite sides. The back side of plate D is grooved as shown in FIGURE 6, this side being clamped against a membrane M. The front side of plate D is grooved as shown in full lines in FIGURE 2, this side being clamped against a separator plate S.

The plates S and D and the membrane sheets M each have a round hole 21 in one corner, as shown in FIGURES 2, 4, 5 and 6. These holes are in the lower right corner of the plates and membranes as viewed from the front in the stacked assemblage and are in register to form a blood inlet passageway also designated as 21 extending through the thickness of the stack and communicating with inlet blood connections $B_1$ and $B_2$, as shown in FIGURE 8 for inlet $B_1$. Plate D is reversed in FIGURE 6 to show its back side whereby hole 21 appears in the lower left corner in FIGURE 6. In a similar manner, the upper right corners of plates S and D and membranes M are provided with circular holes 23 which register in the stack to form blood outlet passageway 23 in FIGURE 9 which communicates with blood outlet connection $B_3$. The opposite end of passageway 23 communicates with outlet connection $B_4$.

Short horizontal grooves 25 are formed in the front side of each plate D to intersect the hole 21 in the plate as shown in FIGURES 2 and 8. Similar grooves 26 intersect the hole 23 as shown in FIGURES 2 and 9. The grooves 25 overlap openings 27 in an adjacent separator plate S as shown in FIGURE 8 and grooves 26 overlap similar openings 28 as shown in FIGURE 9. Openings 27 communicate with a lower cross passageway 30 and openings 28 communicate with an upper cross passageway 31 in a different plate D. Thus, the grooves 25 and 26 on the front side of one plate D communicate through openings 27 in a separator plate S with cross passageway grooves 30 and 31 in the back side of another plate D on the opposite side of the separator. Lower cross passageway 30 communicates with a pair of vertical manifold passageways 32 and upper cross passageway 31 communicates with a pair of vertical manifold passageways 33 as shown in FIGURE 6.

Figure 14:
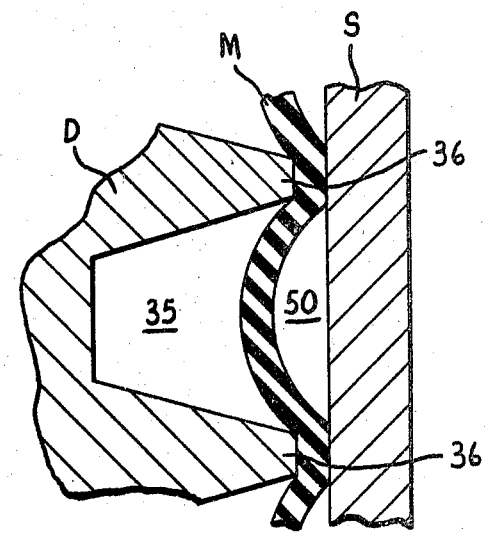
FIGURE 14 is a greatly enlarged fragmentary sectional view, showing one of the capillary passageways.

The manifold passageways 32 and 33 are disposed in inter-fingered relationship and are spaced from each other in such a manner as to embrace between them substantially the whole usable area of the plate. Interconnecting the vertical manifold passageways 32 and 33 are closely spaced, very fine, horizontal grooves 35 which form the capillary system. These grooves are approximately 0.016 inch wide at the widest part, 0.030 inch deep and are all of uniform length. The lands 36 between the grooves 35 in FIGURE 14 are only approximately 0.004 inch wide whereby the grooves themselves occupy substantially the whole area of the plate which encompasses the capillary system and the lands block out only a very minor part of this area.

Blood introducer into inlet passageway 21 passes along these capillary grooves in parallel and is discharged through outlet passageway 23. As will be presently explained, however, the blood does occupy the whole groove 35; the membrane M divides the groove into an oxygen passageway and a blood passageway.

The oxygen connections $O_1$ and $O_2$ in FIGURE 1 communicate with a pair of vertical grooves 40 in the back side of end plate 10 as shown in FIGURE 7. Each groove 40 is in register with the front end of a correspondingly vertically elongated oxygen passageway 41 extending through the stack of membranes and plates to the inner face of back clamping plate 11 as shown in FIGURE 7. Passageways 41 are formed in part by the two vertical rows of holes 42 in membranes M, openings 43 in plates S and openings 44 in plate D.

The front side of each plate D is provided with a vertical series of horizontal grooves 45 communicating with each of the openings 44 as shown in FIGURES 2 and 7. The inner ends of grooves 45 on the right side of plate D communicate through openings 46 with the bottom of end portions of grooves 35 which continue across the bottom of vertical manifold groove 32 and on the left side of the plate the grooves 45 intersect and communicate through openings 46 with the grooves 35 in the bottom of vertical manifold groove 33.

Thus, the openings 46 transfer the incoming oxygen from the front to the back sides of plates D and transfer the outgoing oxygen from the back side of these plates to their front sides. As will be presently explained, membranes M are deflected into the bottoms of these manifold grooves 32 and 33 so that the oxygen goes directly from grooves 45 to grooves 35 without entering manifold grooves 32 and 33.

In operation, oxygen is pumped into connection $O_1$ in FIGURE 1 and oxygen and carbon dioxide are discharged through connection $O_2$. Blood is pumped into the inet connections $B_1$ and $B_2$ and discharged through the outlet connections $B_3$ and $B_4$. The blood is maintained at a higher pressure than the oxygen. For example, the blood pressure at the inlet connections $B_1$ and $B_2$ may be in the range between one and two and one-half pounds per square inch while the oxygen pressure at inlet connection $O_1$ is preferably approximately one-tenth pound per square inch. When the plates and membranes are originally assembled and clamped together, the membranes are flat and do not appear as shown in the sectional views in the drawings. It is the introduction of blood under pressure superior to the oxygen pressure which deflects the elastic membranes into the configurations shown.

Figure 11:
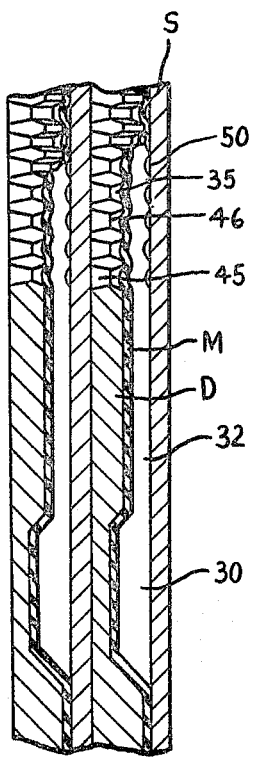
FIGURE 11 is an enlarged view of the assembled plates and membrane sheets, taken on the line 11—11 in FIGURE 2.
Figure 12:
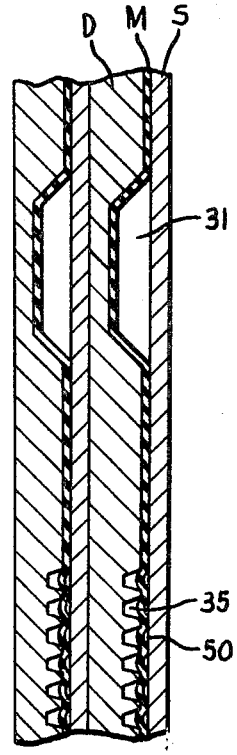
FIGURE 12 is an enlarged view of the assembled plates and membrane sheets, taken on the line 12—12 in FIGURE 2.
Figure 13:
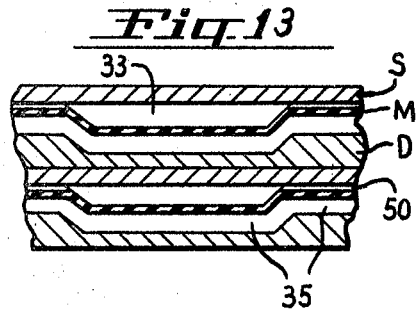
FIGURE 13 is an enlarged view of the assembled plates and membrane sheets, taken on the line 13—13 in FIGURE 2.

When the device is connected with blood and oxygen supply and discharge conduits as just described, the higher pressure of the blood stretches the resilient membrane M partially into the grooves 35 to form capillary blood passageways 50, as shown in FIGURES 12 and 14. The pressure of the blood also deflects the membrane into the bottoms of grooves 30, 31, 32 and 33 as shown in FIGURES 11, 12 and 13, to form blood passageways 51, 52, 53 and 54 in these grooves. The capillary blood passageways 50 are flat on one side and convex on the opposite side where the blood is exposed in thin film-like streams to relatively large area surface contact with the slightly stretched porous membranes where the diffusion exchange takes place. Carbon dioxide in the blood diffuses through the membrane into the oxygen passageway at 35 in FIGURE 14 and oxygen in this passageway diffuses through the membrane into the blood passageway 50 whereby the blood is oxygenated.

The blood and oxygen passageways formed by the various grooves are sealed to prevent escape or intermixing of the two fluids by the flat front and back surfaces of diffusion plates D, the front sides being sealed by membrane sheets M and the back sides being sealed by spacer plates S. As previously mentioned, the diffusion plates also function as gaskets for sealing purposes.

The dual inlet and outlet connections for the blood in FIGURE 1 provide for use of the oxygenator with a special pump which has provisions for alternately interrupting the blood flow in the two end connections for the passageways which extend through the stack. This may be needed to provide a mild pulsatile agitation in the passageways for prevention of blood clot formation in cases where the blood has not been treated with anticoagulant drugs. When pulsating flow is not desired, the back connections $B_2$ and $B_4$ may be removed and the openings for these connections in plate 11 closed with plugs.

The foregoing dimensional and pressure values are given merely by way of example and are not used in a limiting sense. When the device is designed for kidney dialysis, these values may be changed materially.

Modification in FIGURES 15 to 21

In the modification, membrane sheets are clamped between plastic plates to form a stack which is compressed between rigid end plates 10 and 11, as shown in FIGURE 1. The end plates are provided with oxygen and blood connections as shown in FIGURE 1. The membrane sheets are the same as shown in FIGURE 4 except that they need not be elastic. This has the advantage of providing a wider choice of suitable permeable plastic materials such as Teflon and cellophane.

The membranes M are clamped between pairs of plastic plates $P_1$ and $P_2$, both of these plates being grooved to provide blood and oxygen passageways which are closed on one side by the membrane sheets. Plate $P_2$ is made of a relatively hard plastic and plate $P_1$ is made of a relatively softer plastic which functions as a gasket to seal the joints between the plates in the stack. Each plate has a circular hole 21 in its lower right corner whereby the registering holes 21 in all the plates and membranes form a blood inlet passageway, also indicated by the numeral 21 as shown in FIGURE 18. Passageway 21 is in communication with the external connections $B_1$ and $B_2$ in FIGURE 1. In a similar manner, a hole 23 in the upper right corner of all the plates and membranes forms a blood outlet passageway in communication with the external connections $B_3$ and $B_4$ in FIGURE 1.

FIGURE 16 shows the front side of hard plate $P_2$ with reference to the orientation of the stack shown in FIGURE 1 while FIGURE 15 shows the back side of the soft plate $P_1$ in this reference orientation. In other words, the surfaces of the two plates appearing in FIGURES 15 and 16 are those surfaces which engage opposite sides of the same membrane sheet when the parts are assembled.

The blood passageways will be described first. Referring now to FIGURE 18, blood from inlet passageway 21 enters short horizontal grooves 101 in the front sides of plates $P_1$. The inner ends of these grooves intersect the end of a blood cross passageway groove 103 in the back side of plate $P_1$, forming openings 102 through which the incoming blood is transferred from the front to the back sides of plates $P_1$. Openings 102 and groove 103 appear in FIGURE 15. The cross passageway 103 in each plate supplies a pair of vertical inlet manifold passageway grooves 104.

There are similar grooves 101 (not shown) in the front sides of plates $P_1$ communicating with blood discharge passageway 23 and openings 102 in an upper cross passageway groove 105 connected with a pair of vertical outlet manifold passageway grooves 106 on the back side of each plate $P_1$. These manifold passageways 104 and 106 are spaced apart in interfingered relation as shown in FIGURE 15 and are bridged by a large number of very fine horizontal grooves 110 forming blood capillary passageways as shown in FIGURES 15, 19, 20 and 21.

The oxygen passageways will now be described. The oxygen inlet and outlet connections $O_1$ and $O_2$ in FIGURE 1 communicate with vertically elongated grooves 40 on the inside of clamping plate 10, as previously described in connection with FIGURE 7. These elongated grooves register with openings 115 in the opposite sides of plates $P_1$ and $P_2$ and with the two rows of holes 42 in the membranes M to form oxygen inlet and outlet passageways extending through opposite sides of the stack, generally designated as 115 as shown in FIGURE 17.

Communicating with passageways 115 are short horizontal grooves 116 in the front sides of the soft plates $P_1$. These grooves communicate through openings 117 in the back sides of hard plates $P_2$ with oxygen grooves 120 in the front sides of plates $P_2$. Openings 117 and grooves 120 appear in FIGURE 16. Incoming oxygen is thereby transferred from the front sides of plates $P_1$ to grooves 120 in the front sides of plates $P_2$ and outgoing oxygen and carbon dioxide are transferred from grooves 120 to the front sides of plates $P_1$ for discharge through external connection $O_2$.

As seen in FIGURES 19 to 21, the grooves 110 and 120 are disposed in confronting relation in the stacked assemblage and are separated by the membrane sheet M, the groove 110 being a blood capillary passageway and the groove 120 being an oxygen passageway. Grooves 110 are relatively shallow in depth so that the blood travels in these grooves in a thin film along the membrane for the efficient diffusion of carbon dioxide out of the blood and oxygen into the blood in a relatively short path of travel. In this embodiment the inelastic membrane is not deflected and the entire membrane remains in a single plane when the device is in use.

The grooves 110 and 120 may be considerably wider than grooves 35 in FIGURE 14 since the membrane in FIGURE 21 does not bulge into groove 120 and make blood capillary 110 objectionably thick in cross section. It is desired that grooves 110 be very shallow to constrain the capillary blood streams to thin ribbons or films having maximum exposure to the membrane.

Lands 121 and 122 are made as narrow as possible so as to mask a minimum area of membrane from contact with the blood and oxygen. With narrow lands a lack of precise vertical register between grooves 110 and 120 may be tolerated. At the same time, the wider grooves make it easier to obtain approximate register in commercial production.

As in the first embodiment, all areas of the plates and membranes between and surrounding the various grooves are sealed against leakage and intermixing of the two fluids by the clamping pressure of bolts 12 on the stack.

Having now described my invention and in what manner the same may be used, what I claim as new and desire to protect by Letters Patent is:

1. A membrane fluid diffusion exchange device comprising a rectangular, planar capillary system, an inlet passageway for a first fluid extending along one side of said rectangle, inlet manifold passageways for said first fluid perpendicular to said inlet passageway extending from said inlet passageway substantially across said rectangle, an outlet passageway for said first fluid extending along the opposite side of said rectangle, outlet manifold passageways for said first fluid perpendicular to said outlet passageway extending from said outlet passageway substantially across said rectangle, said inlet and outlet manifold passageways all being spaced equidistant from each other in interfingered relationship, said capillary system comprising a plurality of groups of discrete parallel capillary passageways of uniform length interconnecting said inlet and outlet manifold passageways whereby said fluid flows in opposite directions through adjacent groups of said capillary passageways, a membrane sheet forming at least one side of said passageways so that one side of said membrane sheet is exposed to said first fluid, and means for passing a second fluid on the opposite side of said membrane.

2. A device as defined in claim 1, said capillary passageways comprising grooves in confronting sides of a pair of plates, said membrane sheet being clamped between said plates, and said means comprising one of said plates.

3. A device as defined in claim 1, said passageways comprising grooves in a plate and said membrane sheet convering said grooves.

4. A device as defined in claim 3 including a second plate clamping said membrane sheet against said grooved plate, and means for passing said first and second fluids through said capillary passageway grooves on opposite sides of said membrane sheet.

5. A device as defined in claim 3 including a stack of said plates and membrane sheets wherein said plates and sheets have openings therein forming inlet and outlet passageways for said first and second fluids extending through the stack.

6. A device as defined in claim 1 having two of said inlet manifold passageways, two of said outlet manifold passageways and three groups of said capillary passageways, whereby said first fluid flows in one direction through two groups of said capillary passageways and in the opposite direction through the third group.

7. A device as defined in claim 1 wherein said first fluid comprises a fluid to be treated by said second fluid.

8. A device as defined in claim 7 wherein said first fluid comprises blood and said second fluid comprises oxygen.

9. A device as defined in claim 7 wherein said first fluid comprises blood and said second fluid comprises a liquid.

10. A membrane fluid diffusion exchange device comprising a stacking of plates and flexible membrane sheets held in tight compression between two end blocks, said plates and membrane sheets having aligned openings throughout the stack forming manifold inlet and discharge passages for each of two fluids, and manifold passages connecting with passages in the end blocks for outside connection to the device; said stacking comprising a multiplicity of series of elements; each series comprising a rigid plate with openings therethrough, a flexible membrane sheet, and a plate of molded material having a multiplicity of fine grooves over a wide area thereof, stacked throughout in the order named; wherein a first fluid may be pressured through the device in a flow circuit comprising an inlet passage through an end block, an inlet manifold passage, a group of inlet slot passages formed between a rigid plate and a molded plate, an opening through the rigid plate, a system of distribution ducts formed between the rigid plate and a membrane by pressure stretching the membrane into depressions in an adjoining molded plate, a multiplicity of capillary ducts formed likewise by stretching said membrane into fine grooves in the molded plate, a similar system of collecting ducts, an opening through the rigid plate, through a group of outlet slot passages into a discharge manifold, and out of the device through an opening in an end block; and wherein a second fluid may be passed through the device in a flow circuit entering through an end block into an inlet manifold, through a group of inlet slot passages, through slot openings in the molded plate, through multiple slot passages formed between the molded plate and the membrane, through another group of slot openings and slot passages into a discharge manifold, and out through an opening in an end block; said flow circuits being repeated in each series of plates and membranes wherein said device may bring two fluids having chemical exchange properties into wide exposure through the membrane.

References Cited

UNITED STATES PATENTS

| | | | |
|---|---|---|---|
| 3,074,559 | 1/1963 | Savino | 210—321 |
| 3,332,746 | 7/1967 | Claff et al. | 210—321 X |
| 2,982,416 | 5/1961 | Bell | 210—498 X |

OTHER REFERENCES

Peirce, E. Converse II, "A Modification of the Clowes Membrane Lung," from J. Thorack and Cardiovas. Surg., vol. 39, No. 4, April 1960, pp. 438–448.

Crescenzi et al., "Development of Simplified Membrane Oxygenator," Transactions of the American Society for Artifical Internal Organs, vol. 5, 1959, copies may be ordered from Dr. George E. Schreiner, Dept. of Medicine, Georgetown University Hospital, Washington, D.C., pp. 148–156.

Prados et al. "The Influence of Membrane Permeability and of Design on Gas Exchange in the Membrane Lung," from Transactions of the American Society for Artificial Internal Organs, vol. 6, 1960, pp. 52–61.

REUBEN FRIEDMAN, Primary Examiner

FRANK A. SPEAR, JR., Assistant Examiner

U.S. Cl. X.R.

23—258